US009235277B2

(12) United States Patent
Tan et al.

(10) Patent No.: US 9,235,277 B2
(45) Date of Patent: Jan. 12, 2016

(54) PROFILE MANAGEMENT METHOD

(75) Inventors: Min-Liang Tan, Singapore (SG); Ping He, Singapore (SG)

(73) Assignee: RAZER (ASIA-PACIFIC) PTE LTD., Singapore (SG)

(*) Notice: Subject to any disclaimer, the term of this patent is extended or adjusted under 35 U.S.C. 154(b) by 431 days.

(21) Appl. No.: 12/959,707

(22) Filed: Dec. 3, 2010

(65) Prior Publication Data

US 2012/0144307 A1 Jun. 7, 2012

(51) Int. Cl.
G06F 3/01 (2006.01)
G06F 15/177 (2006.01)
G06F 3/038 (2013.01)
A63F 13/30 (2014.01)

(52) U.S. Cl.
CPC .............. *G06F 3/038* (2013.01); *A63F 13/12* (2013.01); *A63F 2300/1018* (2013.01); *A63F 2300/5546* (2013.01)

(58) Field of Classification Search
USPC ........................................................ 715/735
See application file for complete search history.

(56) References Cited

U.S. PATENT DOCUMENTS

| 6,359,661 | B1* | 3/2002 | Nickum ..................... 348/734 |
| 7,040,987 | B2 | 5/2006 | Walker et al. |
| 2002/0151366 | A1 | 10/2002 | Walker et al. |
| 2004/0212595 | A1 | 10/2004 | Zhou |
| 2007/0112983 | A1 | 5/2007 | Yamada et al. |
| 2007/0283059 | A1 | 12/2007 | Ho et al. |
| 2009/0063179 | A1* | 3/2009 | Huang ............................ 705/1 |
| 2009/0100129 | A1 | 4/2009 | Vigil et al. |

FOREIGN PATENT DOCUMENTS

| CN | 101378393 A | 3/2009 |
| TW | I268417 | 12/2006 |
| TW | 200841260 | 10/2008 |
| TW | I312465 | 7/2009 |

OTHER PUBLICATIONS

International Preliminary Report on Patentability mailed Jul. 30, 2012 for PCT App No. PCT/SG2011/000426, filed Dec. 5, 2011, titled Profile Management Method, inventors Min-Liang Tan et al.
First Office Action mailed Mar. 27, 2015 in Chinese patent application No. 201180058303.3.
Taiwan Intellectual Property Office, First Office Action dated Feb. 9, 2015, for Taiwanese Patent Application No. 100143756.

* cited by examiner

*Primary Examiner* — Peiyong Weng
(74) *Attorney, Agent, or Firm* — Novak Druce Connolly Bove + Quigg LLP

(57) ABSTRACT

Most computer operating systems are able to automatically configure the coupled computer peripheral device for use with the computer operating system without the need for installation of a specific driver. However, when these peripheral devices are detected by the computing system, a generic UI control configuration is often assigned to them and whatever customised settings previously configured by the user will be lost and replaced with a new set of unfamiliar setting. This poses much inconvenience and hassle to gamers when they use a different computing system or machine. Described according to an embodiment of the invention is a profile management method, operating on a computing cloud, comprising steps for receiving client data provided by a computing system detecting coupling of a user-interface (UI) thereto and for retrieving configuration data corresponding to the client data for use in configuring the UI by the computing system.

27 Claims, 5 Drawing Sheets

PROFILE MANAGEMENT METHOD

FIELD OF INVENTION

The present invention relates generally to peripheral devices for computing systems. In particular, the invention relates to a system and method for managing the profile of peripheral devices for user-interfaces of computing systems.

BACKGROUND

In most computer games, speed and accuracy are often of significant importance to gamers. Familiarity with gaming control configurations will therefore determine how one performs in the game. Typically, frequent gamers have a specific set of customised device configurations uniquely suited for their game play. For example, to initiate a punch or to engage a weapon, gamers are able to re-assign combinations of keys on the keyboard or on the mouse to initiate different UI control. Gamers often do not break away from this set of configuration as it allows them familiarity and hence speed and control during gaming.

Some of these gamers are even equipped with their own preferred peripheral devices. Computer peripheral devices include but are not limited to computer mice, keyboards, handheld gaming consoles and joysticks. Known computer peripheral devices are typically interchangeable and can be used with different computer systems and platforms. Most computer operating systems are able to automatically configure the coupled computer peripheral device for use with the computer operating system without the need for installation of a specific driver. However, when these peripheral devices are detected by the computing system, a generic UI control configuration is often assigned to them and whatever customised settings previously configured by the user will be lost and replaced with default settings. This poses much inconvenience and hassle to gamers when they enter LAN-gaming shops or utilise computers for their gaming pleasures as they would have to reconfigure the control settings to suit their preferences.

There is, therefore, an apparent need for a method whereby these device settings and configurations can be stored and retrieved on the fly so that users can do away with the hassle of re-configuring their control settings whenever they use a different platform to access the different peripheral devices.

SUMMARY

In accordance with a first aspect of the invention, there is disclosed a profile management method comprising receiving client data provided by a computing system, with the client data comprising device data being descriptive of a user-interface (UI) in signal communication with the computing system, and associating one of a plurality of device profiles with the device data, each of the plurality of device profiles having configuration data associated therewith. The device data is further descriptive of the user interactions identifiable by the UI. The profile management system further comprises providing the configuration data associated with the one of the plurality of device profiles to the computing system for configuring operation of the UI with the computing system therewith.

In accordance with a second aspect of the invention, there is disclosed a profile management system comprising a controller module for receiving client data provided by a computing system. The client data comprises device data being descriptive of a user-interface (UI) in signal communication with the computing system. The device data is further descriptive of the user interactions identifiable by the UI. The profile management system further comprises a storage module having stored thereon a plurality of device profiles, each of the plurality of device profiles having configuration data associated therewith, and a processor module for associating one of a plurality of device profiles stored on the storage module with the device data. The configuration data associated with the one of the plurality of device profiles is providable by the controller module to the computing system for configuring operation of the UI with the computing system therewith.

In accordance with a third aspect of the invention, there is disclosed a machine readable medium having stored therein a plurality of programming instructions, which when executed, the instructions cause the machine to: receive client data provided by a computing system, the client data comprising device data being descriptive of a user-interface (UI) in signal communication with the computing system, the device data being further descriptive of the user interactions identifiable by the UI; associate one of a plurality of device profiles with the device data, each of the plurality of device profiles having configuration data associated therewith; and provide the configuration data associated with the one of the plurality of device profiles to the computing system for configuring operation of the UI with the computing system therewith.

DETAILED DESCRIPTION

Reference will now be made in detail to an exemplary embodiment of the present invention, examples of which are illustrated in the accompanying drawings. While the invention will be described in conjunction with the embodiment, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention For purposes of brevity and clarity, descriptions of embodiments of the present invention are limited hereinafter to the transfer and management of device profiles, in particular, device configurations, to client device associated with the computing system. This however does not preclude embodiments of the invention where fundamental principals prevalent among the various embodiments of the invention such as operational, functional or performance characteristics are required.

Figure 1:
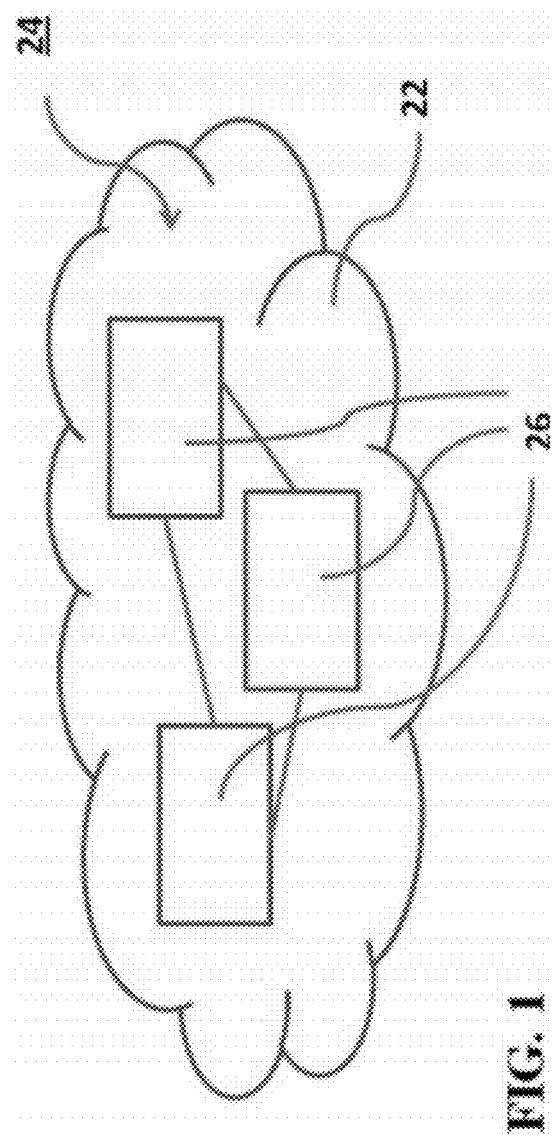
FIG. 1 shows a system diagram of a profile management system residing on a computing cloud according to an exemplary embodiment of the invention.
Figure 2:
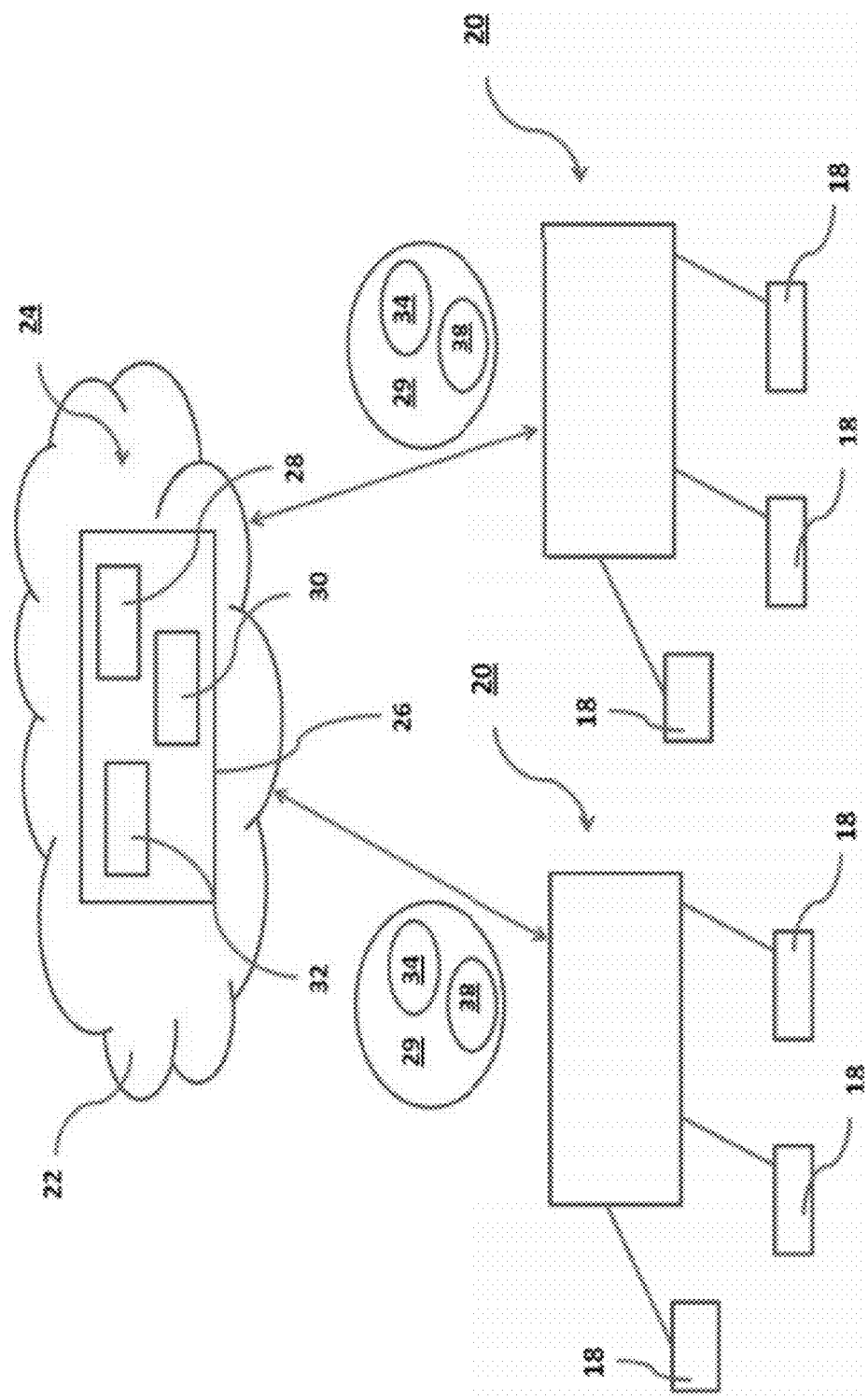
FIG. 2 shows a system diagram of the profile management system of FIG. 1 with user-interfaces in signal communication with computing systems coupled thereto.
Figure 3:
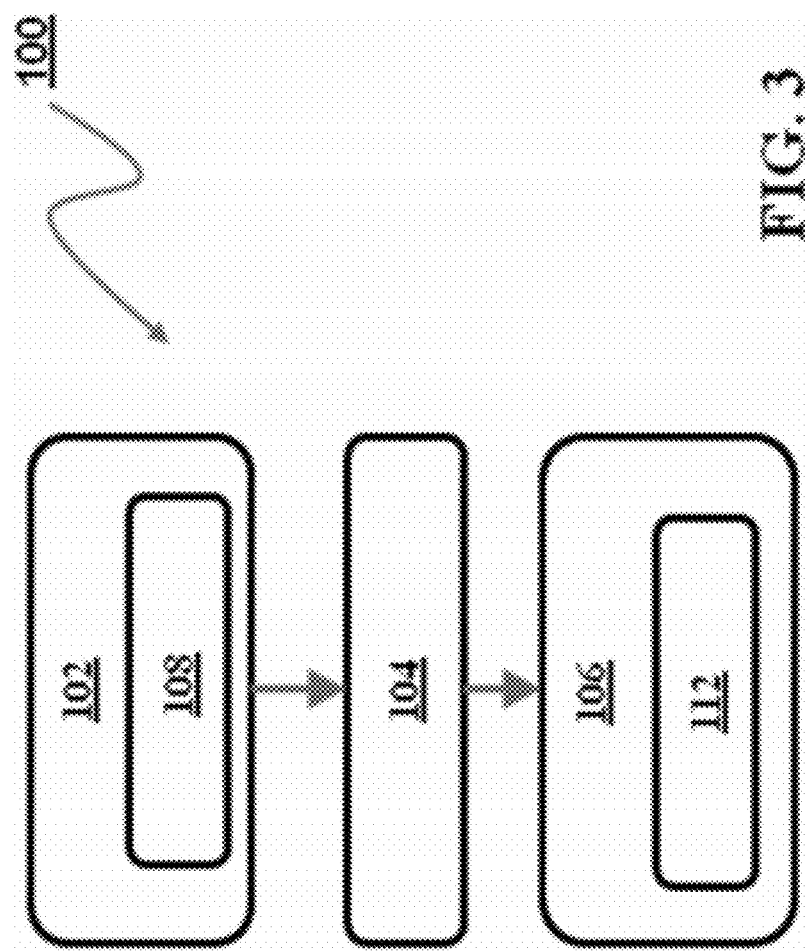
FIG. 3 shows a process flow diagram of a profile management method for implementation by the collaboration management system of FIG. 1.
Figure 4:
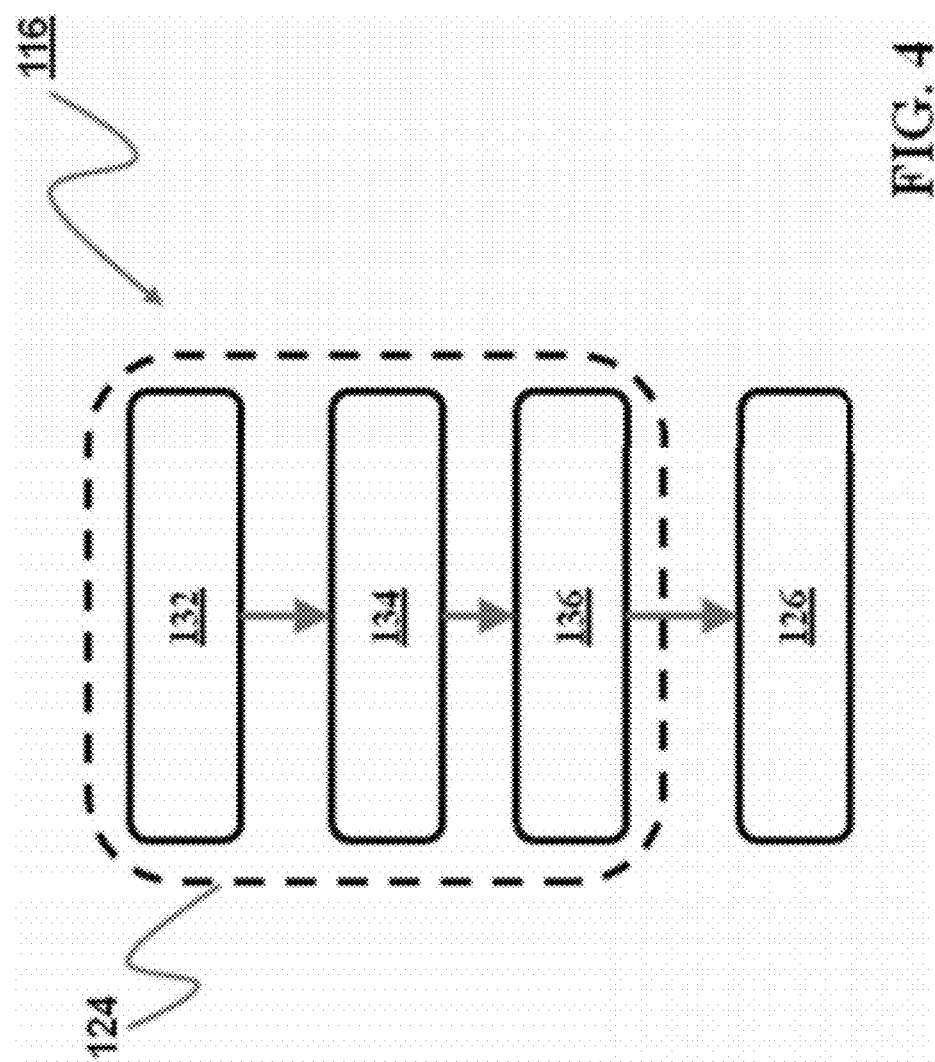
FIG. 4 shows a process flow diagram of a device discovery method for implementation by the computing systems of FIG. 2.
Figure 5:
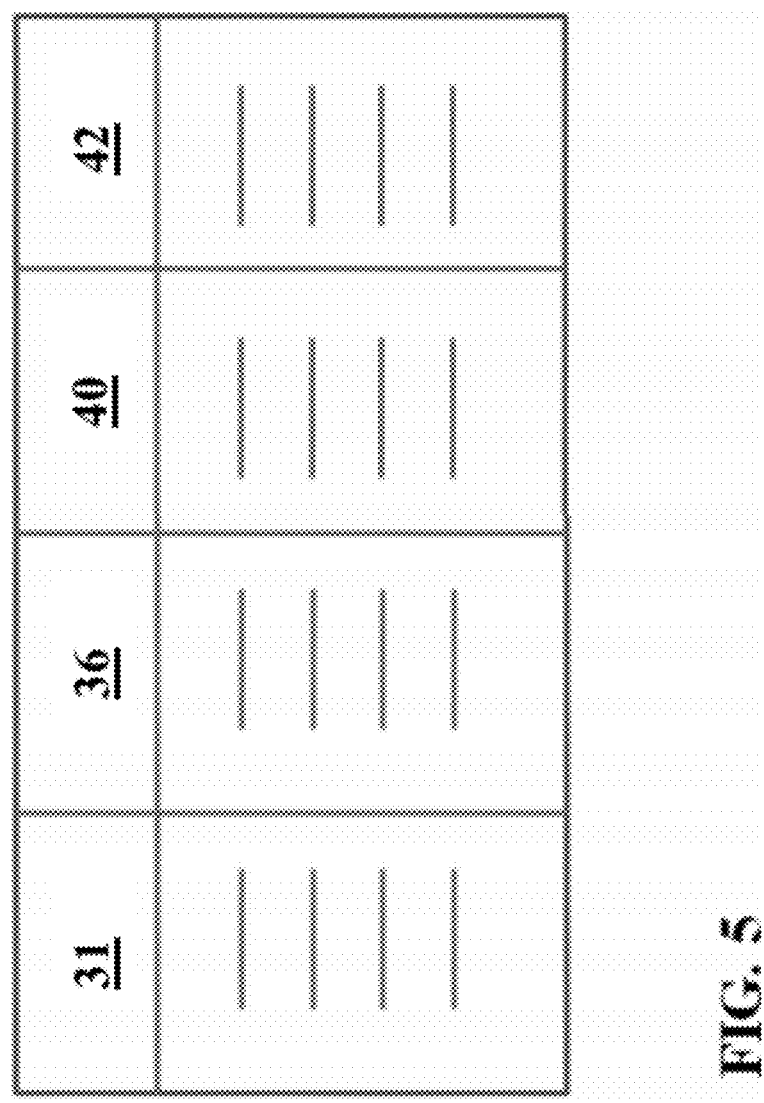
FIG. 5 shows an arrangement of device profile, configuration data, user identifier and authentication data residing on the profile management system of FIG. 1.

An exemplary embodiment of the invention, a profile management method 100, is described hereinafter. The profile management method 100 is preferably for managing configuration of user interfaces (UI) 18 coupled to computing system 20 in communication with a computing cloud 22. Further described, with reference to FIGS. 1 to 6, is a profile management system 24, residing on the computing cloud 22, for applying the profile management method 100.

Generally, the profile management system 24 enables a configuration for UIs 18 to be created by a user so that the configuration can be readily accessed from different locations or from different computer terminals when the same or similar type of UI 18 is used. For example, when a user carries a personal mouse from location to location, the user does not have to reconfigure the mouse at each new location or at a new computer terminal. The configuration for the UI 18, including the preferred settings therefor, are downloadable via the computer terminal the UI 18 is coupled to. This even applies to newly acquired devices where the UI 18 thereof can be configured for use "out of the box" via downloading the corresponding configuration previously created by a user, a third party, the device manufacturer or an application developer, for example, a gaming application. The configurations for the UIs 18 are preferably stored on one or more servers with each configuration catering to a specific, or similar, UI type and relating to a specific user identified by a user identifier. Download of the configuration can be initiated via various means including by the coupling of the UI 18 to a computer system, connecting to a specific network address, for example an IP address or a URL, launching of a particular application or game application or through operating of controls within an application. Preferably, information on the UI type is providable to the one or more server so that the configuration corresponding to the UI type, and preferably further corresponding to a particular user ID, can be identified for download and subsequent configuration of the corresponding UI 18.

With reference to FIGS. 1 to 5, the computing cloud 22 comprises one or multiple server systems 26 inter-networked and configured to function as the profile management system 24. Communication pathway between the computing cloud 22 and the computing system 20 is preferably provided via a local area network (LAN), a wide area network (WAN), the Internet, cellular networks, data networks, dedicated networks or a combination of any thereof.

The profile management system 24 comprises a controller module 28 for receiving client data 29 provided by the computing system 20, a storage module 30 for storing a plurality of device profiles 31 and a processor module 32. The client data 29 comprises device data 34 for associating with one of the plurality of the device profiles 31 by the processor module 32.

The profile management method 100 comprises a step 102 of receiving the client data 29 providable by the computing system 20 by the profile management system 24, a step 104 of associating one of the plurality of device profiles 31 within the profile management system 24 with the client data 29 and a step 106 of providing configuration data 36 associated with one of the plurality of device profiles 31 to the computing system 20 for configuration of the UI 18 thereafter.

The device data 34 is preferably descriptive of the UI 18 associated with the computing system 20. The device data 34 is further descriptive of the user interactions identifiable by the UI 18. Preferably, the UI 18 is one of a computer peripheral coupled with an interface formed integral with the computing device. Examples of computer peripherals include but are not limited to gaming console, joystick, computer mouse, keyboard and speakers. Alternatively, the UI 18 includes devices which are connectable for use with or forms part of the computing system 20, for example, the touch screen display of a cell phone or a smart phone with the non-UI portions of the cell phone or smart phone forming the computing system 20. The UI 18 is preferably at least one of actuation, for example mouse button actuation or key presses, touch, light, sound, motion and position sensing. Detection and recognition of the UI 18, or its functional equivalent, occurs when the UI 18 is in signal communication with the computing system 20. The computing system 20 generates the device data 34 for the UI 18 when the UI 18 is recognised thereby. For example, if the UI 18 is a 3D mouse, the user interactions identifiable by the 3D mouse would include free-space movement or position, scrolling actions and actuation of specific buttons existing on the 3D mouse. However, if the UI 18 is a multi-touch interface, the user interactions identifiable by the multi-touch interface would include locations of one or more points and gestures generatable by the one or more touch points on the multi-touch interface. Therefore, the user interactions identifiable and hence the device data when the UI 18 is a 3D mouse differs from when the UI 18 is a multi-touch interface.

When a user couples the UI 18 to the computing system 20 in network communication to the computing cloud 22, the profile management system 24 is able to receive the client data 29 generated by the computing system 20. The UI 18 may be connected to the computing system 20 via wired or wireless signal connection. Detection of the UI 18 can be configured by the user to be in response to coupling of the UI 18 to the computing system 20 or to be effected by the user by executing a routine or application on the computing system. Application programming interfaces (APIs) or components of software development kits (SDKs) is preferably made available for programmers, game developers and application developers to incorporate the function of detecting the UI 18 onto their computing systems 20 and software applications. This will provide the user with better control over how and when the UI 18 is to be detected for discovery and sending of the client data 29 to the profile management system 24. The APIs and components of SDKs may be provided for development of auto-executable routines residing on the UI 18 for initiating the profile management method 100 upon detection thereof by the computing system 20 when the UI 18 is coupled thereto. In such an instance, the device data 34 specific to the UI 18 may be pre-defined and preloaded onto the UI 18, preferably, onto a memory module residing on the UI 18.

Preferably, the client data 29 further comprises identifier data 38 uniquely matched to at least one of a plurality of user identifiers 40 residing on the storage module 30. Upon receiving of the client data 29 by the profile management system 24 in the step 102, the profile management system 24 further processes the client data 29 for either user registration or log-on to the profile management system 24. For an existing user with an identity existing as one of the plurality of user identifiers 40 on the storage module 30, access to the profile management system 24 triggers the processor module 32 to associate the particular one of the user identifiers 40 with the identifier data 38. Upon associating the one of the user identifiers 40 with the identifier data 38, the one of the device profiles 31 and the configuration data 36 corresponding thereto are consequently identified. As an alternative over the identifier data 38 or in the absence of the identifier data 38, the device data 34 may be used for identifying the corresponding one of the device profiles 31 and the corresponding configuration data 36. In an event where none of the device profiles 31 exactly matches the device data 38, a closest matching one of the device profiles 31 may be selected instead. The controller module 28 can be configured to select a closest matching one of all the device profiles 31 on the storage module 30 or a closest matching one of only the device profiles 31 associated with a particular one of the user identifiers 40.

In an example of use of the profile management system 24, a user couples his multi-touch device, the UI 18, to a public computer, the computing system 20. One or both of the multi-touch device and the public computer may be pre-loaded with a sub-routine to automatically connect to the profile management system 24 for initiating the profile management method 100. Alternatively, the user can manually connect with the profile management system 24, for example, via a URL using a web browser. Once the profile management method 100 has been initiated, the multi-touch device will send information, the client data 19, to the profile management system 24 indicating that it is of a multi-touch device type, the device data 34. The sent information can include the user's name or a user identifier, the identifier data 38. On the profile management system 24, the user identifier 40 matching with the user's name may have multiple device profiles 31 associated therewith, for example various types of devices including a 3-D mouse, a specific model of gaming mouse and a multi-touch device. With the sent information indicating that the multi-touch device is of a multi-touch device type, the profile management system 24 can isolate the corresponding one of the multiple device profiles 31 for extracting the configuration data 36 corresponding 36 thereto. The configuration data 36 can include, for the multi-touch device, a library of gestures and corresponding instructions for download to the public computer for configuring use of the multi-touch device with the public computer. Upon the multi-touch device being configured with the public computer, the user can immediately interact with the multi-touch device to generate instructions with gestures the user is familiar with out having to redefine gestures and corresponding instructions.

In another example of use of the profile management system 24, the multi-touch device is a newly acquired device connectable to the profile management system 24, via the user's personal computer, the computing system 20, for locating and downloading a popular gesture library or a library of gesture provided by the manufacturers of the multi-touch device, the configuration data 36 for use in configuring the multi-touch device with the user's personal computer. In yet another example of use of the profile management system 24, the UI 18 is a gaming mouse for use with a public computer, the computing system 20. A user with his preferred settings, the configuration data 36, stored on the profile management system 24 is able to connect the public computer to the profile management system 24 for downloading the configuration data 36 to the public computer. The configuration data for the gaming mouse could include one or more of button configuration, scroll-wheel and mouse displacement sensitivity and lighting or haptic feedback response to the gaming mouse. The availability of the configuration data 36 on the profile management system 24 allows the user to quickly configure the gaming mouse, or other UIs 18, when using the public computer. For retrieval of configuration data 36 from the profile management system 24 in the step 104, the user may either log-on to the profile management system 24 to retrieve stored configuration data 36 accessible to the public or choose to retrieve device data previously uploaded to the profile management system 24 associated with the user identifier 40 belonging to the user. Download of the configuration data 36 by other users is preferably determined by permission settings associated with the configuration data 36. Upon receiving client data 29 by the controller module 28, the profile management system 24 may initiate automated download of the configuration data 36 associated with the device profile 31 matching with the device data 34 of the provided client data 29 in the step 106.

Preferably, the step 102 of receiving client data 29 comprises a step 108 of receiving authentication information (unreferenced) from the computing system 20, for example a password provided by a user, to authenticate the identifier data 34 using the authentication data 42 corresponding thereto. Preferably, the profile management system 24 is configured such that the configuration data 36 in association with the identified one of the device profiles 31 will only be provided by the controller module 28 to the computing system 20 in the step 106 when the identifier data 34 is authenticated. Preferably, the configuration data 36 substantially defines interactions between the UI 18 and at least one of an application and an operating platform operating on the computing system 20. In gaming applications, the configuration data 36 can be a single or a permutation of a plurality of keys on the keyboard for game control such as to engage a weapon or to cast a spell. In non-gaming applications, configuration data can include voice activated commands or gestures to manipulate UI 18 on touch interfaces.

When there exists a mismatch of operating platforms supported by the computing system 20 and which the stored configuration data operates on, the step 106 comprises a step 112 of processing the configuration data 36 for compliance with an operating platform so that the configuration data 36 downloadable from the profile management system 24 can be correctly recognised and configured for operation of the UI 18 with the computing system 20. The operating platform is definable by platform data (unreferenced) constituting a portion of the client data 29 generatable by the computing system 20 for provision to the profile management system 24.

Complementary to and in association with the profile management method 100, there exists a device discovery method 116 configurable by the user for edited of data on the profile management system 24. The device discovery method 116 is preferably applied by the computing system 20. The device discovery method 116 comprises a step 124 of providing client data 29 for log-on to the profile management system 24 and a step 126 of uploading the device data 34 to the profile management system 24.

The step 124 further comprises at least one of a step 132 for detecting coupling of the UI 18 to the computing system 20, a step 134 for manually keying in of identifier data 38 to effect log-on to the profile management system 24 and a step 136 for registering a new user identifier 40 with the profile management system 24. Preferably in the step 132, the computing system 20 detects signal communication of the UI 18 with and generates the client data to effect an automated log-on to the profile management system 24 by associating the identifier data 38 with one of the device profiles 31. Alternatively, the user may configure settings of the device discovery method 116 such that a log-on prompt will be initiated for requesting provision of the identifier data 38 upon the computing system 20 detecting signal communication of the UI 18 therewith. The user will then be required to manually key-in the identifier data 38 in the step 134 for access to the profile management system 24. In the step 136, a new user may register with the profile management system 24 by following through with a registration process. The registration process may request the new user to either manually key-in new identifier data 38 to be stored on the storage module 30 as one of the user identifiers 40 or couple a new device to the computing system 20 for extraction of the identifier data 38 therefrom.

In the step 126, a user may define and upload new client data 24 onto the storage module 30 in the profile management system 24 under one of the user identifiers 40. The device data 34 in association with the client data 29 will be stored in the profile management system 24 as one of the device profiles 31. The configuration data 36 for new UI settings and configuration will also be uploaded for storage by the profile management system 24 and will be registered as being associated with the newly created one of the device profiles 31. Preferably, the profile management system 24 allows for subsequent editing of the configuration data 36 after being uploaded to the storage module 30.

In the gaming context, for gamers who are always on the move, their preferred settings configurations for computer peripherals, either general settings or game-specific settings, are made storable and accessible through a multitude of devices and platforms. In LAN-gaming shops or at any public access terminal, gamers have their preferred settings configurations on the fly and downloadable via the profile management system 24 to any terminal or platform in network communication thereto. Users with new gaming devices can also utilise the profile management system 24 to obtain a set of basic setting configuration for the UI 18 without having to manually configure control for any possible manipulation of the UI 18. Update or modification of setting configurations from any computing system 20 in network communication with the profile management system 24 is also an available option.

Additionally, the profile management system 24 is able to process usage information and data stored in the storage module 30 for a variety of applications, including data analytics, and for access by users or third parties. The storage module 30 is preferably accessible by a third party. The third party includes, for example, a games developer, an advertiser or a network service provider. In addition, knowledge of the configuration preferences of users, in particular gamers, will enable game developers to design products that will better satisfy consumers.

In a non-gaming context, for example, when a user connects a multi-touch screen smart phone to profile management system 24 on the computing cloud 22, or when voice command memos are being downloaded from the cell phone to the computing system 20, configurations previously stored in the smart phone for manipulation of the UI 18 as well as specific voice activated commands used previously in the cell phone can be downloaded from the profile management system 24 and thereby be used with the computing system 20, having the various commands or controls mimicked seamlessly.

The profile management method 100 preferably resides on the profile management system 24 as a plurality of instructions stored on a machine readable medium of the profile management system 24. It is preferred that the instructions, when executed, cause the profile management system 24 to perform the step of the profile management method 100. Similarly, the device discovery method 116 exists on the computing system 20 as a plurality of instructions stored on a machine readable medium thereof. It is preferred that the instructions, when executed, cause the profile management system 24 to perform at least one of the steps of the device discovery method 116.

In a forgoing manner, a profile management method 100 and profile management system 24 are described according to exemplary embodiments of the invention. Although only a number of embodiments of the invention are disclosed in this document, it will be apparent to one skilled in the art in view of this disclosure that numerous changes and/or modifications can be made to the disclosed embodiments without departing from the scope and spirit of the invention.

The invention claimed is:

1. A profile management method comprising:
   detecting coupling of a user interface (UI) with a local computing system, the UI in signal communication with the local computing system;
   providing client data from the local computing system to a remote computing system in communication with the local computing system, the client data comprising device data being descriptive of the UI and user interactions identifiable by the UI;
   associating one of a plurality of device profiles with the device data, each of the plurality of device profiles having configuration data associated therewith;
   downloading the configuration data associated with the one of the plurality of device profiles from the remote computing system to the local computing system for configuring operation of the UI with the local computing system, in response to at least a portion of the user interactions identifiable by the UI,
   wherein the UI device comprises one of a computer peripheral coupled with an interface formed integral with the local computing system, a device connectable for use with the local computing system, and a part of the local computing system.

2. The profile management method as in claim 1, wherein the client data further comprises identifier data that is indicative of the user interactions identifiable by the UI device.

3. The profile management method as in claim 2, wherein the associating one of a plurality of device profiles with the device data comprises:
   associating one of a plurality of user identifiers with the identifier data, each of the plurality of user identifiers having at least one of the plurality of device profiles associated therewith; and
   associating the device data with one of the plurality of device profiles associated with the one of the plurality of user identifiers associated with the identifier data.

4. The profile management method as in claim 2, further comprising:
   providing authentication data from the local computing system to the remote computing system; and
   authenticating the identifier data using the authentication data,
   wherein the configuration data is downloaded from the remote computing system to the local computing system in response to the identifier data being authenticated.

5. The profile management method as in claim 1, wherein the configuration data substantially defines interactions between the UI device and at least one of an application and an operating platform operating on the local computing system.

6. The profile management method as in claim 1, wherein downloading the configuration data associated with the one of the plurality of device profiles from the remote computing system to the local computing system comprises:

processing the configuration data for compliance with an operating platform, the client data comprising a platform data describing the operating platform.

7. A remote computing system for management of profiles, the remote computing system comprising:
- a detection module for detecting coupling of a user interface (UI) with a local computing system, the UI in signal communication with the local computing system, the local computing system in communication with the remote computing system;
- a controller module for providing client data from the local computing system to the controller module, the client data comprising device data being descriptive of the UI and user interactions identifiable by the UI;
- a storage module having stored thereon a plurality of device profiles, each of the plurality of device profiles having configuration data associated therewith;
- a processor module for associating one of a plurality of device profiles stored on the storage module with the device data wherein at least one of the detection module, the controller module, the storage module, and the processor module comprises hardware, wherein the configuration data associated with the one of the plurality of device profiles is downloadable from the controller module to the local computing system for configuring operation of the UI with the local computing system in response to at least a portion of the user interactions identifiable by the UI, and wherein the UI comprises one of a computer peripheral coupled with an interface formed integral with the local computing system, a device connectable for use with the local computing system, and a part of the local computing system.

8. The remote computing system as in claim 7, wherein the client data further comprises identifier data that is indicative of the user interactions identifiable by the UI device.

9. The remote computing system as in claim 8, wherein the processor module is further for:
- associating one of a plurality of user identifiers with the identifier data, each of the plurality of user identifiers having at least one of the plurality of device profiles associated therewith; and
- associating the device data with one of the plurality of device profiles associated with the one of the plurality of user identifiers associated with the identifier data.

10. The remote computing system as in claim 9, further comprising:
- an authentication module for providing authentication data from the local computing system to the controller module; and
- authenticating the identifier data using the authentication data,
- wherein the configuration data is downloaded from the controller module to the local computing system in response to the identifier data being authenticated.

11. The remote computing system as in claim 7, wherein the configuration data substantially defines interactions between the UI device and at least one of an application and an operating platform operating on the local computing system.

12. The remote computing system as in claim 7, wherein the processor module is further for processing the configuration data for compliance with an operating platform, the client data comprising a platform data describing the operating platform.

13. A non-transitory machine readable medium having stored therein a plurality of programming instructions, which when executed, cause the machine to:
- detect coupling of a user interface (UI) with a local computing system, the UI in signal communication with the local computing system, the local computing system in communication with the machine;
- provide client data from the local computing system to the machine, the client data comprising device data being descriptive of the UI and user interactions identifiable by the UI;
- associate one of a plurality of device profiles with the device data, each of the plurality of device profiles having configuration data associated therewith;
- download the configuration data associated with the one of the plurality of device profiles from the machine to the local computing system for configuring operation of the UI with the local computing system in response to at least a portion of the user interactions identifiable by the UI, wherein the UI comprises one of a computer peripheral coupled with and an interface formed integral with the local computing system, a device connectable for use with the local computing system, and a part of the local computing system.

14. The non-transitory machine readable medium as in claim 13, wherein the client data further comprises identifier data that is indicative of the user interactions being identifiable by the UI device.

15. The non-transitory machine readable medium as in claim 14, wherein the plurality of programming instructions, when executed, cause the machine to associate one of a plurality of device profiles with the device data by:
- associating one of a plurality of user identifiers with the identifier data, each of the plurality of user identifiers having at least one of the plurality of device profiles associated therewith; and
- associating the device data with one of the plurality of device profiles associated with the one of the plurality of user identifiers associated with the identifier data.

16. The non-transitory machine readable medium as in claim 14, wherein the plurality of programming instructions, when executed, further cause the machine to:
- provide authentication data from the local computing system to the machine; and
- authenticate the identifier data using the authentication data,
- wherein the configuration data is downloaded from the machine to the local computing system in response to the identifier data being authenticated.

17. The non-transitory machine readable medium as in claim 13, wherein the configuration data substantially defines interactions between the UI device and at least one of an application and an operating platform operating on the local computing system.

18. The non-transitory machine readable medium as in claim 12, wherein the plurality of programming instructions, when executed, further cause the machine to:
- process the configuration data for compliance with an operating platform, the client data comprising a platform data describing the operating platform.

19. The profile management method as in claim 1, further comprising uploading a second configuration data from the local computing system to the remote computing system, the second configuration data defined by a user with the local computing system.

20. The profile management method as in claim 1, further comprising editing the configuration data with the local computing system.

21. The profile management method as in claim 1, further comprising enabling access of the configuration data to an entity independent of the remote computing system and the local computing system.

22. The remote computing system as in claim 7, wherein the controller module is further for uploading a second configuration data from the local computing system to the remote computing system, the second configuration data defined by a user with the local computing system.

23. The remote computing system as in claim 7, wherein the configuration data is editable with the local computing system.

24. The remote computing system as in claim 7, wherein the configuration data is accessible by an entity independent of the remote computing system and the local computing system.

25. The non-transitory machine readable medium as in claim 13 wherein the plurality of programming instructions, when executed, further cause the machine to upload a second configuration data from the local computing system to the machine, the second configuration data defined by a user with the local computing system.

26. The non-transitory machine readable medium as in claim 13, wherein the configuration is data editable with the local computing system.

27. The non-transitory machine readable medium as in claim 13, wherein the configuration data is accessible by an entity independent of the remote computing system and the local computing system.

* * * * *